United States Patent Office 3,330,483
Patented July 11, 1967

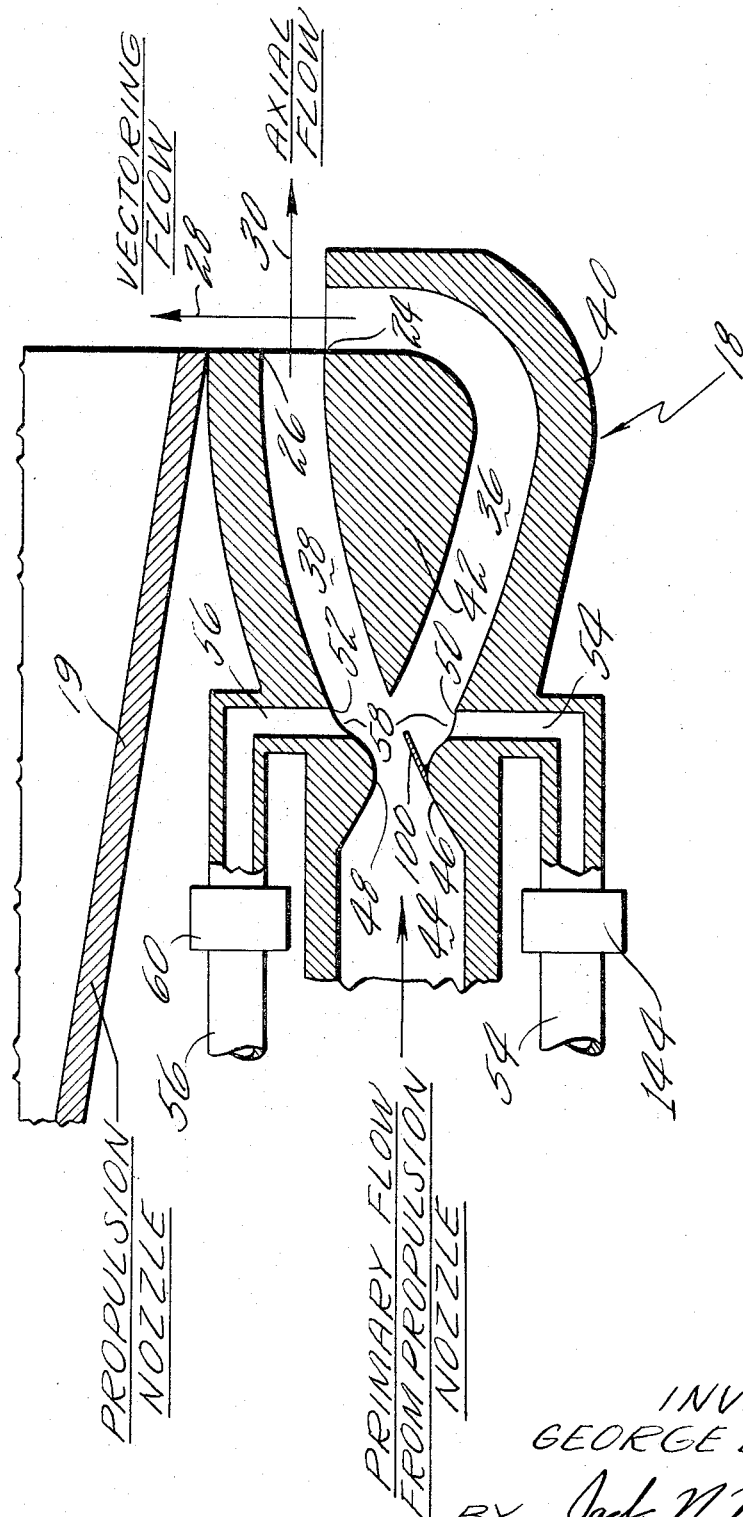

3,330,483
BISTABLE VALVE CONTROL
George D. Lewis, North Palm Beach, Fla., assignor to United Aircraft Corporation, East Hartford, Conn., a corporation of Delaware
Filed Oct. 26, 1964, Ser. No. 407,616
2 Claims. (Cl. 239—265.23)

This invention relates to means for starting flow in a bistable valve when it is imperative that the flow in the valve be initiated in a particular passage.

An object of this invention is to provide a bistable fluid valve with disposable means for insuring that initial flow starts in a predetermined passage.

Another object of this invention is to provide a disposable tab which provides direction to flow in a bistable valve so that it will pass into the desired passageway.

A further object of this invention is to provide a tab having a low melting point so that the primary flow melts said tab when it has performed its function.

Another object of this invention is to provide a bistable thrust vector control unit in which primary gas flow issuing from a nozzle can be initially directed into one of two predetermined passageways, said primary gas burning out the flow deflecting means so that normal bistable switching can be accomplished thereafter.

Other objects and advantages will be apparent from the specification and claims and from the accompanying drawing which illustrates an embodiment of the invention.

The figure shown is a view showing a bistable thrust vector control unit attached to a nozzle with a disposable tab located within the valving unit to provide an original direction to the primary flow.

A bistable fluid valve is shown in the patent to Kepler et al., U.S. Patent No. 3,135,291. Referring to the drawing, a bistable thrust vector control unit having a fluid operated valve is indicated generally at 18 and an associated main nozzle section is generally indicated at 19. First and second exhaust outlets are shown respectively at 24 and 26 and said outlets are adapted to emit first and second fluid jets. In obtaining full directional control of a rocket having a main nozzle 19, a plurality of these contoured units 18 are placed around the periphery of the nozzle. Only the operation of one will be described.

As shown, the outlets 24 and 26 are arranged with their longitudinal center lines 28 and 30 angularly related so that the jet emitted from each outlet crosses and blocks the mouth of the other outlet.

The valve 18 is or may be of a known type and includes an inlet passageway 44 which communicates with each of a pair of branch passageways 36 and 38 leading to the outlets 24 and 26. The inlet passageway and the branch passageways are defined within a casing or housing means 40 and a splitter panel 42 extends between and separates said inlet passageways. Hot gases are introduced to the inlet passageway 44 from the main nozzle 19.

Fluid flow at or in excess of sonic velocity is essential to effective operation of a fluid operating means for switching a fluid stream from one to the other of the branch passageways 36 and 38. A converging section 46 in the inlet passageway 44 can serve to accelerate combustion gases or other fluid to sonic velocity and, downstream of the convergent section 46, the inlet passageway is shown to have a gradually diverging section 48. The section 48 can effect further acceleration of combustion gases or other fluid in accordance with known phenomena.

A switching or operating means in the valve 18 for selectively directing fluid flow through the branch passageways 36 and 38 from the inlet passageway 44 includes first and second switching jets emitted respectively from opposed first and second control nozzles or nozzle sections 50 and 52. The nozzles 50 and 52 are arranged so that the switching jets issuing therefrom are substantially transverse with respect to the direction of fluid flow through the inlet passageway 44. As shown, the control nozzles 50 and 52 are formed integrally with the aforesaid casing or housing means 40 and they have associated supply passageways 54 and 56 which are connectible with a suitable high pressure fluid source which can be hot gases from the nozzle.

Valve 144 is located in passageway 54 and valve 60 is located in passageway 56. These valves can selectively open and close these passageways to cause the first and second switching jets to issue from their corresponding nozzles.

The control nozzles 50 and 52 communicate with the inlet fluid passageway 44 at a short outwardly stepped or sharply divergent section 58 of the inlet passageway 44 and the said section serves an important function in the switching of fluid flow from one branch passageway to the other. A localized low pressure region is created in the section 58 adjacent an inactive control nozzle when fluid flow occurs past the nozzle and this region contributes to maintenance of the fluid stream wholly within one of the branch passageways. For example, when the second branch passageway 38 is active substantially all fluid passing through the inlet passageway 44 also passes through said branch passageway at least partially under the influence of a low pressure region adjacent the mouth of the control nozzle 52. Conversely, when inlet passageway fluid passes through the first branch passageway 36, a low pressure region occurs adjacent the mouth of the control nozzle 50 and this region contributes to the maintenance of the fluid stream wholly within the passageway 36.

On starting the rocket engine involved having a propulsion nozzle 19, the flow through 44 would ordinarily randomly select either passageway 38 or 36; however, since vectoring control is involved, it is imperative that flow start in all of the bistable thrust vector control units along the passageways 38 so that there is no directional control until it is called for. To insure such flow, tabs 100 are connected within each of the control units as an extension to the convergent section 46. These tabs continue on across the mouth of passageway 36 and extend in a direction which is aligned with the wall of passageway 38 formed by the splitter panel 42. Each tab 100 has a low melting point permitting itself to melt out due to the temperature of the primary flow from the propulsion nozzle after it has directed the flow into the passageway 38. Thereafter, with the tab melted out, normal flow switching can be done. For example, in most arrangements where the temperatures reach 4000°–6000° R. a thin aluminum tab can be used.

It is to be understood that the invention is not limited to the specific description above or other specific figures, but may be used in other ways without departure from its spirit as defined by the following claims.

I claim:
1. In combination, a propulsion nozzle, a bistable thrust vector control unit connected to said nozzle, said control unit having an inlet and two outlets, said inlet being connected to the propulsion nozzle to receive flow therefrom, one of said outlets having its flow directed in an axial direction with the flow from the propulsion nozzle, the other of said outlets having its flow directed to go across the flow from the propulsion nozzle to provide a directional control, tab means in said control unit for initially directing the flow from the inlet to one of said outlets, said inlet having a throat section therein with a converging-diverging contour, said tab means including a tab extending from said inlet as an extension of said converging portion towards one of said outlets, said tab having a low melting point such that it will be melted after it has performed its directing function, said control unit having other means for switching flow from the inlet to either of said outlets when desired.

2. In combination, a propulsion nozzle, a bistable thrust vector control unit connected to said nozzle, said control unit having an inlet and two outlets, said inlet being connected to the propulsion nozzle to receive flow therefrom, one of said outlets having its flow directed in an axial direction with the flow from the propulsion nozzle, the other of said outlets having its flow directed to go across the flow from the propulsion nozzle to provide a directional control, tab means in said control unit for initially directing the flow from the inlet to one of said outlets, said inlet having a throat section therein with a converging-diverging contour, said tab means including a tab extending from said inlet as an extension of said converging portion and in line with the inner wall of one of said outlets, said tab having a low melting point such that it will be melted after it has performed its directing function, said control unit having other means for switching flow from the inlet to either of said outlets when desired.

References Cited
UNITED STATES PATENTS

| | | | |
|---|---|---|---|
| 2,924,174 | 2/1960 | McLean | 239—265.15 X |
| 2,984,972 | 5/1961 | Davidson | 137—74 X |
| 3,111,291 | 11/1963 | Horton | 60—35.55 |
| 3,143,856 | 8/1964 | Hausmann | 60—35.54 |
| 3,181,545 | 5/1965 | Murphy | 235—201 X |

CARLTON R. CROYLE, *Primary Examiner.*

BENJAMIN A. BORCHELT, *Examiner.*

G. H. GLANZMAN, *Assistant Examiner*